United States Patent [19]
Bell

[11] Patent Number: 5,321,945
[45] Date of Patent: Jun. 21, 1994

[54] APPARATUS FOR CONTROLLING FUEL TRANSFERS IN A DISTRIBUTED FUEL TANK SYSTEM

[75] Inventor: Douglas A. Bell, Glendale, Ariz.

[73] Assignee: Honeywell Inc., Minneapolis, Minn.

[21] Appl. No.: 20,023

[22] Filed: Feb. 18, 1993

Related U.S. Application Data

[60] Division of Ser. No. 859,638, Mar. 20, 1992, which is a continuation of Ser. No. 503,392, Apr. 2, 1990, abandoned.

[51] Int. Cl.$^5$ ............................................. F02C 7/236
[52] U.S. Cl. .................................... 60/39.15; 60/734; 244/135 C
[58] Field of Search ............... 60/39.15, 734, 739; 244/135 R, 135 C; 137/255, 263, 266

[56] References Cited

U.S. PATENT DOCUMENTS

| | | | |
|---|---|---|---|
| 2,676,461 | 4/1954 | Gove | 60/739 |
| 3,503,411 | 3/1970 | Bauer et al. | 137/101.25 |
| 4,591,115 | 5/1986 | DeCarlo | 244/135 C |
| 4,918,619 | 4/1990 | Orloff et al. | 364/509 |
| 4,922,349 | 5/1990 | Abe et al. | 358/443 |
| 4,932,609 | 6/1990 | Secchiaroli et al. | 244/135 C |
| 4,955,962 | 9/1990 | Mell | 244/23 C |
| 4,992,946 | 2/1991 | Butz et al. | 364/431.02 |

OTHER PUBLICATIONS

Casamassa et al. *Jet Aircraft Power Systems* McGraw-Hill, New York, 1957 p. 81.

*Primary Examiner*—Louis J. Casaregola
*Attorney, Agent, or Firm*—A. A. Sapelli; W. Udseth

[57] ABSTRACT

The present invention relates to a distributed fuel system, wherein a plurality of fuel tanks used for storing fuel are distributed in different locations.

The fuel tanks are connected to each other via a manifold which permits fuel to flow therein. The distributed fuel system includes a plurality of control components interposed at predetermined points of the manifold to permit or restrict the flow of the fuel contained in the manifold in response to control signals. A method for distributing the fuel between the fuel tanks to achieve predetermined levels in each of the fuel tanks comprises the steps of determining the status and condition of the fuel system. The functions to be performed are then selected. Based on the system status and the functions to be performed, the configuration of the control elements is selected to perform the functions to be performed. The control signals are outputted to the control components to obtain the desired configuration of the control components for causing the fuel flow within the distributed fuel system to accomplish the desired functions, thereby yielding the desired fuel distribution.

1 Claim, 6 Drawing Sheets

|  MASK WORD | MATCH WORD | CONFIGURATION WORD | |
|---|---|---|---|
| 00F7 | 00A3 | 0000 | ← FIRST ENTRY IN LIST |
| 0077 | 0003 | 0000 | |
| 0077 | 0013 | 0023 | |
| 0077 | 0023 | 06C0 | |
| ⋮ | ⋮ | ⋮ | |
| 0000 | 0000 | FFFF | ← LAST ENTRY IN LIST |

END OF LIST FLAG VALUE

APPARATUS FOR CONTROLLING FUEL TRANSFERS IN A DISTRIBUTED FUEL TANK SYSTEM

This is a divisional of copending application Ser. No. 07/859,638 filed on Mar. 20, 1992 (abandoned), which is a continuation of application 07/503,392, filed Apr. 2, 1990 (abandoned).

BACKGROUND OF THE INVENTION

This invention relates to a method of controlling fluid transfers, and more particularly, to a method for controlling fuel transfers from the fuel tanks of a distributed fuel tank system as normally found aboard an aircraft.

In an aircraft fuel system which consists of a plurality of fuel tanks, fuel lines connect the tanks to one another and to the aircraft engines. Pumps and valves (sometimes referred to herein collectively as components) are utilized to control the fuel flow, and numerous sensors are utilized throughout to monitor the system. The state (or configuration) of the control components is set to satisfy multiple criteria simultaneously. Some functions which are performed by the distributed fuel tank system are routine functions, e.g., deliver fuel to an engine. Some functions are to accommodate an abnormal condition or failure, e.g., fuel gets cold with possibility of freezing or a pump fails. Some functions are performance enhancement functions, i.e. make the aircraft operate more efficiently.

There exists a number of functions which are to be performed for a given set of conditions (i.e., climbing, on the ground, taxiing, ... ). Further, all the functions to be performed are not necessarily compatible with one another. Thus, it is readily apparent that there can exist a situation in which some of the functions to be performed can be in "conflict" with one another, because of the limited number of resources (i.e., pumps, valves, ... ). This "conflict" then needs to be resolved based on the current status of the aircraft, and the functions that need to be performed. Thus there exists a need to resolve the state (or sometimes referred to herein as configuration) of the pumps, valves, ... based on the functions needed to be performed and their relative priority with the limited set of components (pumps, valves, ... ) available. In a situation in which one fuel tank has too much fuel and another tank has too little fuel, it is desired that fuel from the one tank be transferred to the second tank such that the tanks are in balance. This situation could occur when the aircraft engines are operating or when the aircraft engines are shut down. If the situation were to occur while the engines are operating, the transfer occurs while fuel flow is maintained to the engines. Fuel tank balance is desired for a number of reasons. Maintaining the balance minimizes the stress applied to the aircraft structure. Keeping the tanks in balance assists in controlling the aircraft center of gravity, which in turn determines how efficiently the aircraft flies with the corresponding cost savings.

Present day solutions to the above identified problem are handled simply by including an additional crew member, a second officer (also known as the flight engineer), working in the cockpit to monitor the fuel system via various indicator lights and gages. At the flight engineer work station, all the switches, meters, ... are available to permit the flight engineer to turn on/off the pumps, valves, ... and allows the monitoring of the flow, pressures, quantities of the fuel in the system. Based on the current operating conditions, the flight engineer's knowledge of the system, and established operating procedures, the flight engineer recognizes certain conditions, e.g., the fuel tanks are out of balance. The flight engineer determines which pumps need to be turned on, which valves need to be opened, ... in order to correct the condition. When the quantities in the tanks reach the levels desired by the flight engineer, the pumps and valves are shut down. The fuel tanks are now balanced as desired by the flight engineer. This present day system is oriented towards a human flight engineer who has detailed knowledge of the system, and extensive training and experience on how to operate the system. The flight engineer is intuitively aware of the aircraft flight regime, and is capable of interpreting all instructions from the other flight crew members or radio communications, is capable of reading and interpreting the aircraft log book, and seeks additional information and guidance from the flight crew, maintenance personnel, aircraft dispatcher, radio communications, and operating manuals when deemed necessary, and is capable of making subjective evaluations from other information available.

In order to reduce aircraft operating costs, it is desired that the crew be reduced by eliminating the flight engineer. Thus there is a need to have an automated system which performs as closely as possible the functions of the flight engineer in an automated fuel distribution system predictably, reliably, and consistently. It is understood that the use of the terms "maintaining" and "balancing" as used herein (e.g., maintaining fuel levels or balancing fuel levels in the fuel tanks) is intended to be inclusive in the overall controlling function (i.e., controlling fuel transfer) performed by the present invention.

SUMMARY OF THE PRESENT INVENTION

Therefore, there is provided by the present invention, a method of controlling fuel transfers from each of the tanks of a distributed fuel tank system. The present invention relates to a distributed fuel system, wherein a plurality of fuel tanks used for storing fuel are distributed in different locations. The fuel tanks are connected to each other via a manifold which permits fuel to flow therein. The distributed fuel system includes a plurality of control components interposed at predetermined points of the manifold to permit or restrict the flow of the fuel contained in the manifold in response to control signals. A method for distributing the fuel between the fuel tanks to achieve predetermined levels in each of the fuel tanks comprises the steps of determining the status and condition of the fuel system. The function to be performed is then selected. Based on the system status and the function to be performed, the configuration of the control elements is selected to perform the function to be performed. The control signals are outputted to the control components to obtain the desired configuration of the control components for causing the fuel flow within the distributed fuel system to accomplish the desired function, thereby yielding the desired fuel distribution.

Accordingly, it is an object of the present invention to provide a method for controlling the fuel flow within a distributed fuel tank system.

This and other objects of the present invention will become more apparent when taken in conjunction with the following description and attached drawings, wherein like characters indicate like parts, and which drawings form a part of the present application.

DETAILED DESCRIPTION

Figure 1:
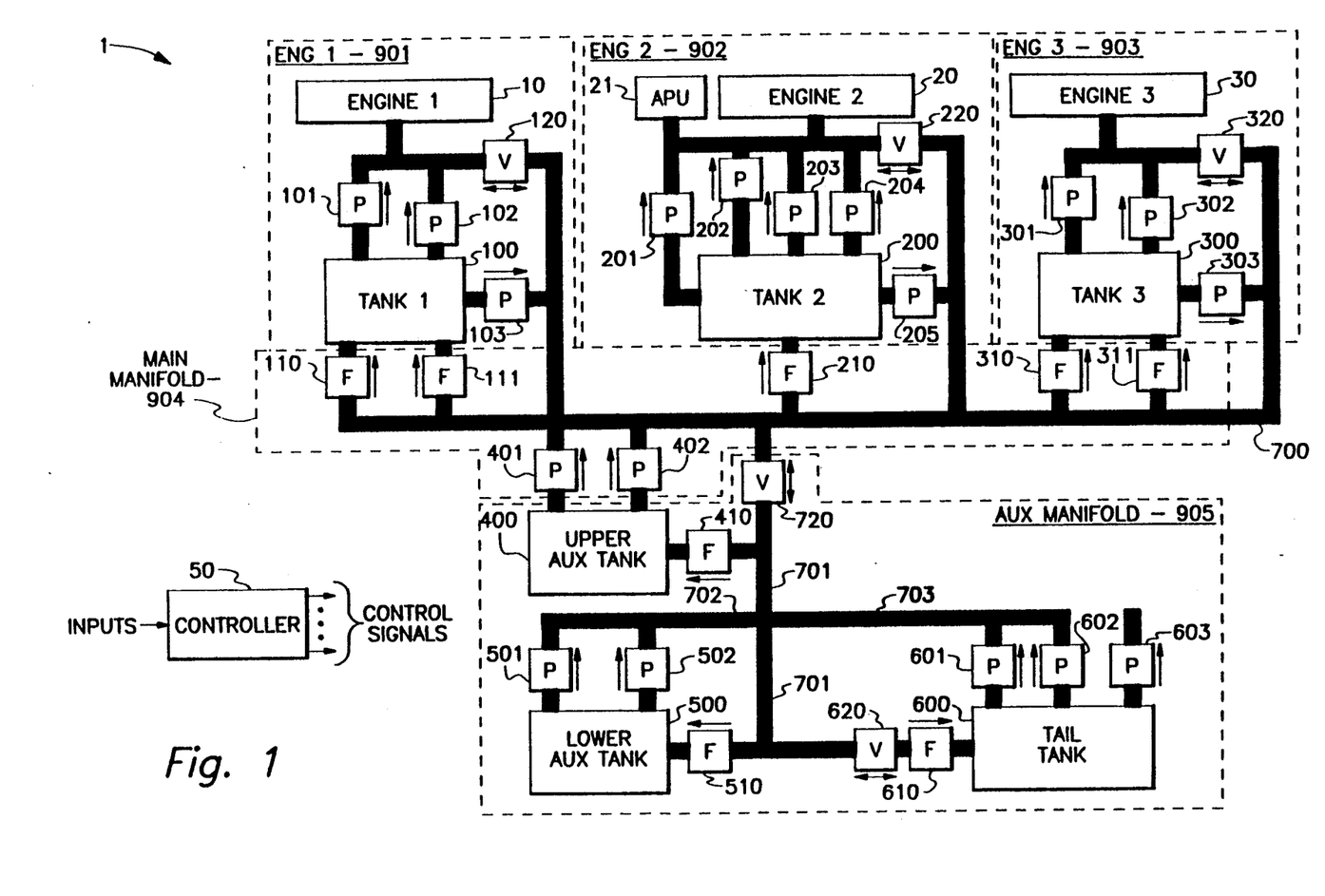
FIG. 1 shows a layout of components which comprise the fuel system of the preferred embodiment of the present invention.

Referring to FIG. 1, there is shown a layout diagram of the components which make up the fuel distribution system 1 of the preferred embodiment of the present invention. The preferred embodiment of the present inventions is for an aircraft having three (3) engines, engine 1 10, engine 2 20, and engine 3 30. An auxiliary power unit (APU) 21 is also included, to provide electrical power and air conditioning when the aircraft is on the ground. Six (6) fuel tanks (or more simply tanks), tank 1 100, tank 2 200, tank 3 300, upper auxiliary tank (Upper Aux Tank) 400, lower auxiliary tank (Lower Aux Tank) 500, and tail tank 600, are included in the aircraft for which the preferred embodiment of the present invention is described. Manifolds 700-703 are used to connect the tanks 100-600 to the engines 10-30. Fuel pumps (or more simply pumps), P, which supply pressurized fuel from a tank to a fuel manifold, are distributed throughout the fuel distribution system 1 as shown. Similarly, fill valves, F, and manifold valves, V, are distributed throughout the fuel distribution system 1 as shown in FIG. 1. Pumps, P, when turned on supply pressurized fuel from a tank to a manifold, and fill valves, F, when opened permit pressurized fuel from a manifold to flow into the tank. Manifold valves, V, control the flow of pressurized fuel from one manifold to another. Thus, manifold valves, V, permit fuel to flow in either direction when opened. The arrows in proximity with the pumps or valves in FIG. 1 are indicative of the direction of the fuel flow, the pumps and valves sometimes referred to herein collectively as control components, or more simply as components. The control components are two (2) state devices, i.e. the pumps are either on or off, and the valves are either opened or closed (not including the transient conditions). As is well known to those skilled in the aircraft arts, the tanks 100-600 are distributed throughout the aircraft, i.e., in the wings, fuselage, tail, . . . .

If tail tank 600 is essentially empty, and while in flight, it is desired to adjust the center of gravity of the aircraft to achieve a more efficient flying posture, fuel from the more forward tank(s) is to be transferred to the tail tank. In order to effectuate this transfer (assuming tank 1 100 and tank 3 300 are very full and are to be emptied), then the configuration of the system is as described. Pumps 101, 102 are on to deliver fuel to engine 1 10, and manifold valve 120 is closed such that there is no interference with fuel flow to engine 1 10. Similarly, pumps 301, 302 are on to deliver fuel to engine 3 30, and manifold valve 32 is closed such that there is no interference with the fuel flow from tank 3 300 to engine 3 30. (Pumps 203, 204 are on to deliver fuel to engine 2 20, and manifold valve 220 is closed such that there is no interference with the fuel flow to engine 2 20. APU 21 may or may not be operative and pump 201 may or may not be on depending upon the volume of fuel required by APU 21 and engine 2 20. Let's assume APU 21, and pumps 201, 202 are off.) Since fuel is not to be transferred from tank 2 200, pump 205 is off. Conversely, since fuel is to be transferred from tank 1 100 and tank 3 300, pumps 103 and 303 are on. Fuel then flows from tank 1 100 and tank 3 300 into manifold 700. Manifold valve 720 is opened permitting fuel to flow into manifold 701. (Since upper aux tank 400 and lower aux tank 500 are not involved in the fuel transfer pumps 401, 402, 501, 502 and fill valves 410, 510 are off and closed, respectively.) Pumps 601, 602, 603 are also off. Manifold valve 620 and fill valve 610 are opened, thereby permitting the fuel in manifold 701 to flow into tail tank 600. When the desired center of gravity is achieved, i.e., the desired amount of fuel has been transferred to tail tank 600, then the transfer process is halted. Manifold valve 620, 720, and fill valve 610 are closed. Then pumps 103, 303 are turned off. The system configuration is now in a quiescent state in which fuel is delivered to the engines 10-30 and no fuel transfers are taking place. It will be understood by those skilled in the art that control of the controlled components is by a processor (or controller) 50. The processor 50 of the preferred embodiment of the present invention is dedicated to the fuel distribution task, although, as will also be recognized by those skilled in the art, the processor need not be dedicated to the fuel distribution task.

Figure 2:
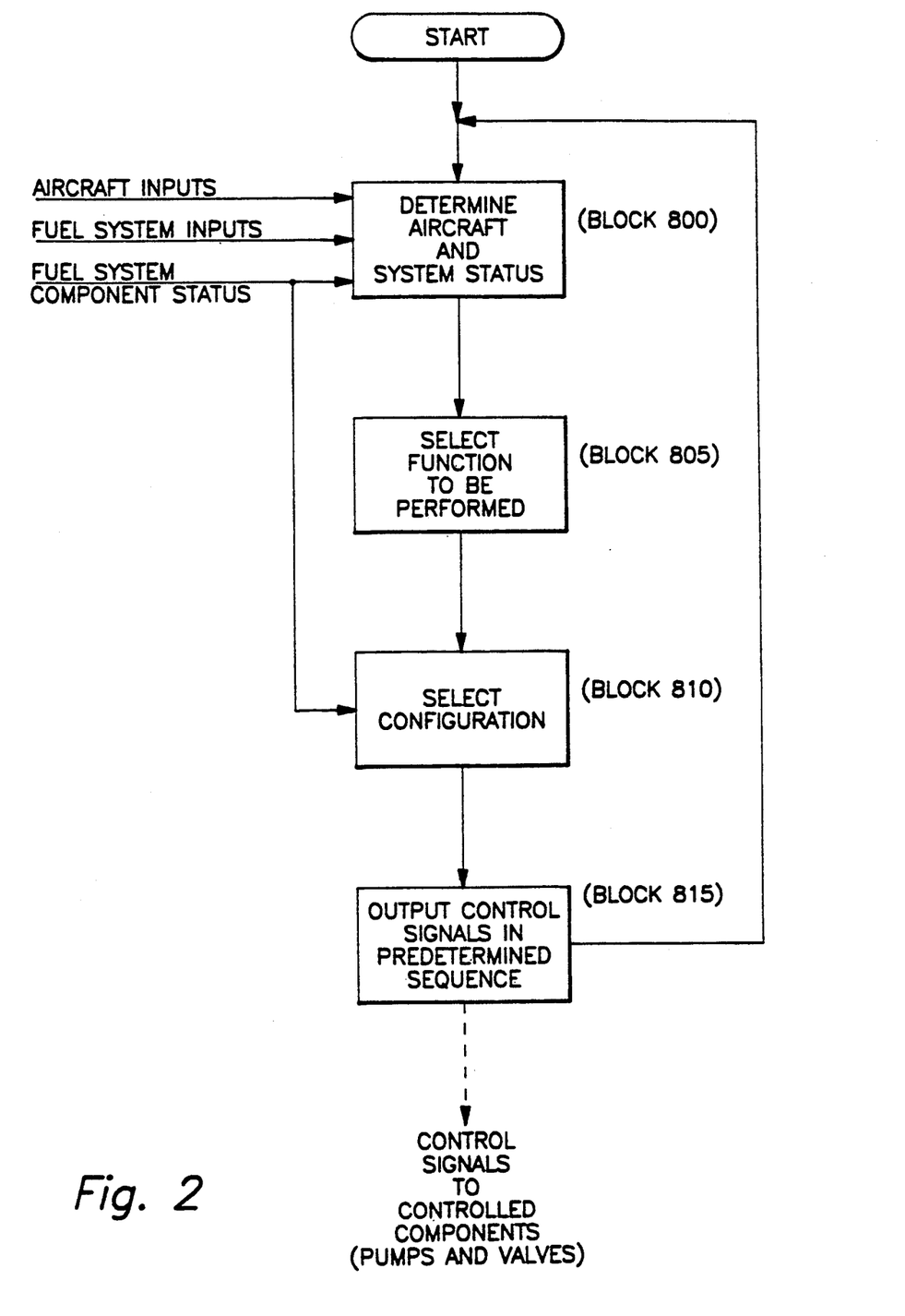
FIG. 2 shows a functional flow diagram performed by a controller of the fuel system of FIG. 1.

Referring to FIG. 2, there is shown a functional flow diagram of the method of the present invention performed by a controller 50 of the distributed fuel system of FIG. 1. Based on data received from systems external to the distributed fuel system 1, aircraft and system status is determined (block 800). The input data received by the processor 50 includes aircraft inputs and fuel system inputs and includes such values as flight configuration (e.g., airspeed, altitude, landing gear position, . . . ) fuel quantities, pump/valve position feedback, . . . . Based on the status information, an evaluation is made to determine which functions need to be accomplished by the controller 50 during the current processing cycle, and the functions are selected (block 805). The functions include:

a. Supplying fuel to engines requiring fuel,
b. Fuel transfers to maintain proper fuel distribution,
c. Fuel transfers to correct or adjust for failures within the fuel system,
d. Fuel transfers to control the aircraft center of gravity,
e. Fuel transfers to comply with the aircraft operating limitations, . . . .

Following the determination of the functions needed, a configuration is selected for the controlled components to accomplish the desired functions. Using the data in the fuel system component status database and the functions to be accomplished, a configuration (or state) for each controlled pump and valve in the system is selected (block 810). After a position for each component is determined, the components are commanded to their desired position in sequence that will ensure a smooth transition from one configuration to the next (block 815).

In the preferred embodiment of the present invention some rules have been established in the sequencing of setting the configuration of the controlled components. Pumps needed to be turned on are initiated before turning off other pumps, and if a valve needs to be opened, the open command is issued followed by a wait of five (5) seconds before any pumps are turned off. (A feedback signal is provided from each controlled component to indicate it's position and response to the command issued, i.e. in part what makes up the fuel system input).

The implementation of the configuration selection process of block 810 discussed above of the preferred embodiment of the present invention will now be described. The fuel system 1 of the present invention is partitioned into 5 subsystems. Referring to FIG. 1, the 5 subsystems are shown as ENG1 901, ENG2 902, ENG3 903, MAIN MANIFOLD 904, and AUX MANIFOLD 905. As a result, each subsystem 901-905 consists of a sub-set of the thirty-one (31) controlled components. Each of these subsystems can be considered an independent "machine" which controls only those components within it's "domain of control". Table 1 lists each machine, and the components within it's control domain.

Figure 3:
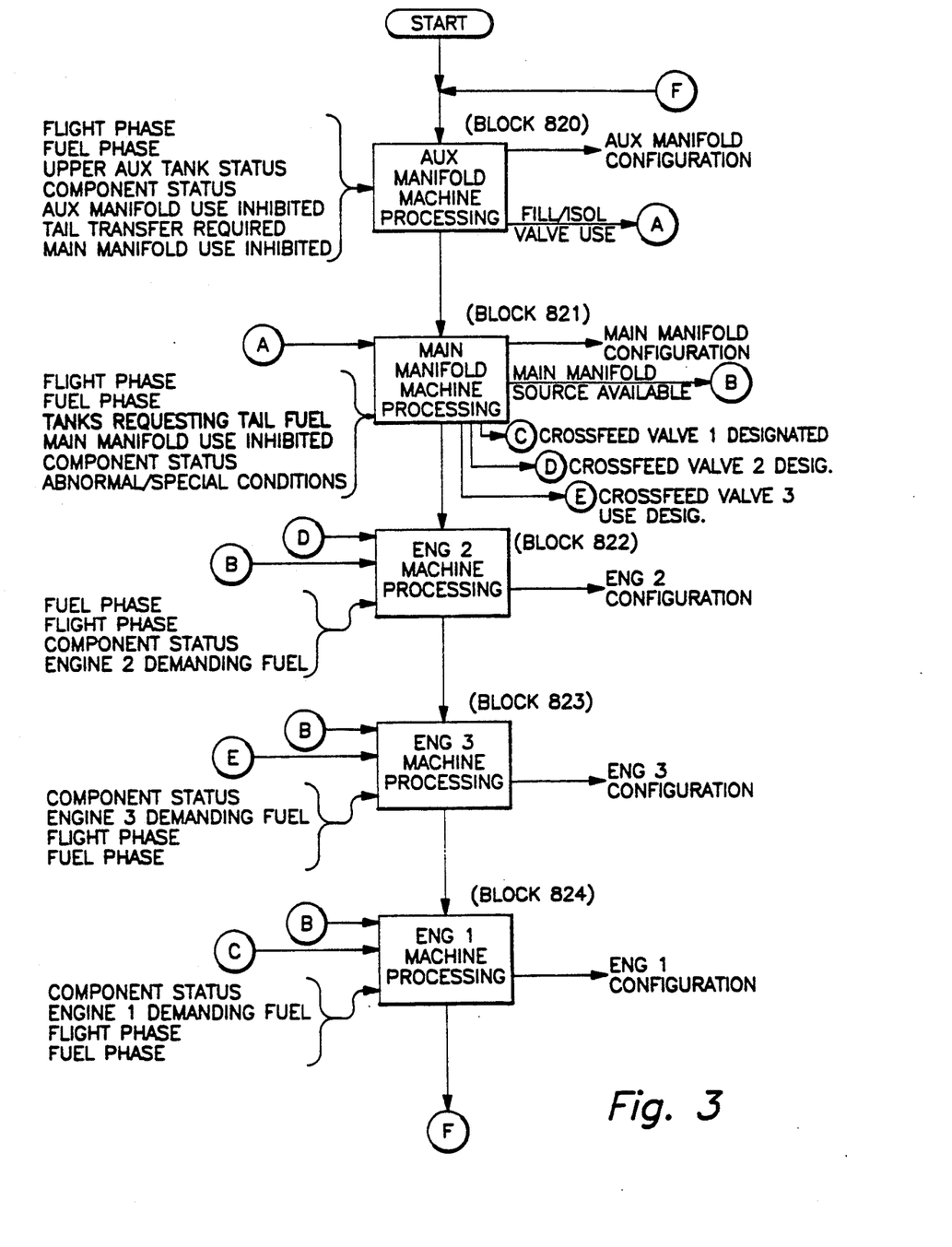
FIG. 3 shows a flow diagram of the configuration selection process of the preferred embodiment of the present invention.

Referring to FIG. 3, there is shown a flow diagram for the configuration selection process. In the preferred embodiment of the present invention, there is one process associated with each subsystem. The processes are executed in the following order:
  a. Aux manifold machine (block 820),
  b. Main manifold machine (block 821),
  c. Engine 2 machine (block 822),
  d. Engine 3 machine (block 823), and
  e. Engine 1 machine (block 824).

TABLE 1

| MACHINE | COMPONENT |
| --- | --- |
| Engine 1 (ENG1-901) | Tank 1 forward pump, 101 |
| | Tank 1 aft pump, 102 |
| | Tank 1 transfer pump, 103 |
| | Crossfeed valve 1, 120 |
| Engine 2 (ENG2-902) | APU feed pump, 201 |
| | Tank 2 forward pump, 202 |
| | Tank 2 left aft pump, 203 |
| | Tank 2 right aft pump, 204 |
| | Tank 2 transfer pump, 205 |
| | Crossfeed valve 2, 220 |
| Engine 3 (ENG3-903) | Tank 3 forward pump, 301 |
| | Tank 3 aft pump, 302 |
| | Tank 3 transfer pump, 303 |
| | Crossfeed valve 3, 320 |
| Main Manifold (904) | Tank 1 fill valve, 110 |
| | Tank 1 outboard fill valve, 111 |
| | Tank 2 fill valve, 210 |
| | Tank 3 fill valve, 310 |
| | Tank 3 outboard fill valve, 311 |
| | Upper aux tank left transfer pump, 401 |
| | Upper aux tank right transfer pump, 402 |
| Aux Manifold (905) | Aux fill/isolation vlave, 720 |
| | Upper aux tank fill valve, 410 |
| | Lower aux tank left transfer pump, 501 |
| | Lower aux tank right transfer pump, 502 |
| | Lower aux tank fill valve, 510 |
| | Tail tank left transfer pump, 601 |
| | Tail tank right transfer pump, 602 |
| | Tail tank boost pump, 603 |
| | Tail tank fill/isolation valve, 620 |
| | Tail tank fill valve, 610 |

Figure 4:
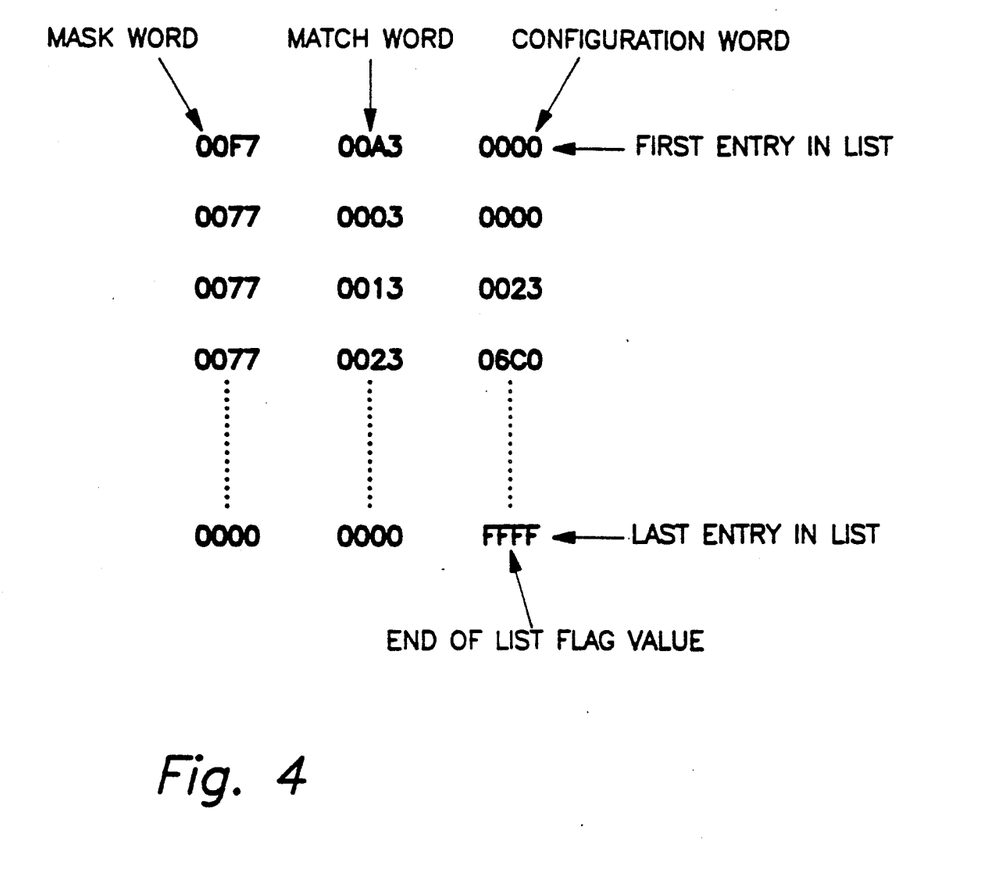
FIG. 4 illustrates a format of the tables defined in the bit map classifier of the preferred embodiment of the present invention.

Each subsystem process (blocks 820-824) has a unique set of inputs that determine which configuration should be selected for the components within its domain. The two processes, for the aux manifold and the main manifold, each pass values to the next sequential process(es) to provide an interface between the subsystems. For any given set of conditions that influence the behavior of a subsystem, there exists a configuration appropriate for those conditions. To establish the association between a set of conditions and the corresponding configuration needed, a bit-mapped classifier technique was used. Referring to FIG. 4, there is illustrated a format of the tables defined to implement the bit-mapped classifier technique used to evaluate the inputs, and from them select the proper configuration. Each entry in the classifier table contains three 16 bit words consisting of a mask, a match pattern, and a configuration word. The use of a mask value allows the entries in the table to be ordered to minimize the length of the table. To select a configuration from the table, a status word is created with each bit in the word representing a particular condition or function needed. This status word serves as the input to the table search routine. The table is searched sequentially by applying the mask to the status word (i.e. combining the status word and the mask using a logical AND operation), and comparing the result to the match pattern. If the bit patterns match, the search is discontinued and the configuration word associated with the matched table entry identifies the desired position (configuration) for each component controlled by the subsystem.

In some cases, when the number of inputs which must be considered is large, a single table is not sufficient to completely define all the possible configurations. In these cases, additional tables are defined. If no match is found in the first table, a new input status word is created and the next table is searched. This process continues until a match is found, or all tables have been searched. If no match is found in the table(s), the controller 50 of the preferred embodiment of the present invention generates a signal which causes the fuel system to revert to a hardware controlled manual mode of operation and alerts the crew of this condition. Each subsystem maintains and processes its own table. It should be apparent now that the results of some subsystems impact the configuration of another subsystem. Thus, some results are passed to another machine. The sequence of processing of the subsystems, in the preferred embodiment of the present invention, is from aft to forward since this is the "normal" flow of fuel in an aircraft. Pumps and valves are under the control of the subsystem to which it is allocated.

A sample definition of an input status word and configuration output word for the aux manifold machine is shown below as Tables 2 and 3. The input status words and configuration output words for the other configuration selection machines are defined in a similar manner.

Figure 5:
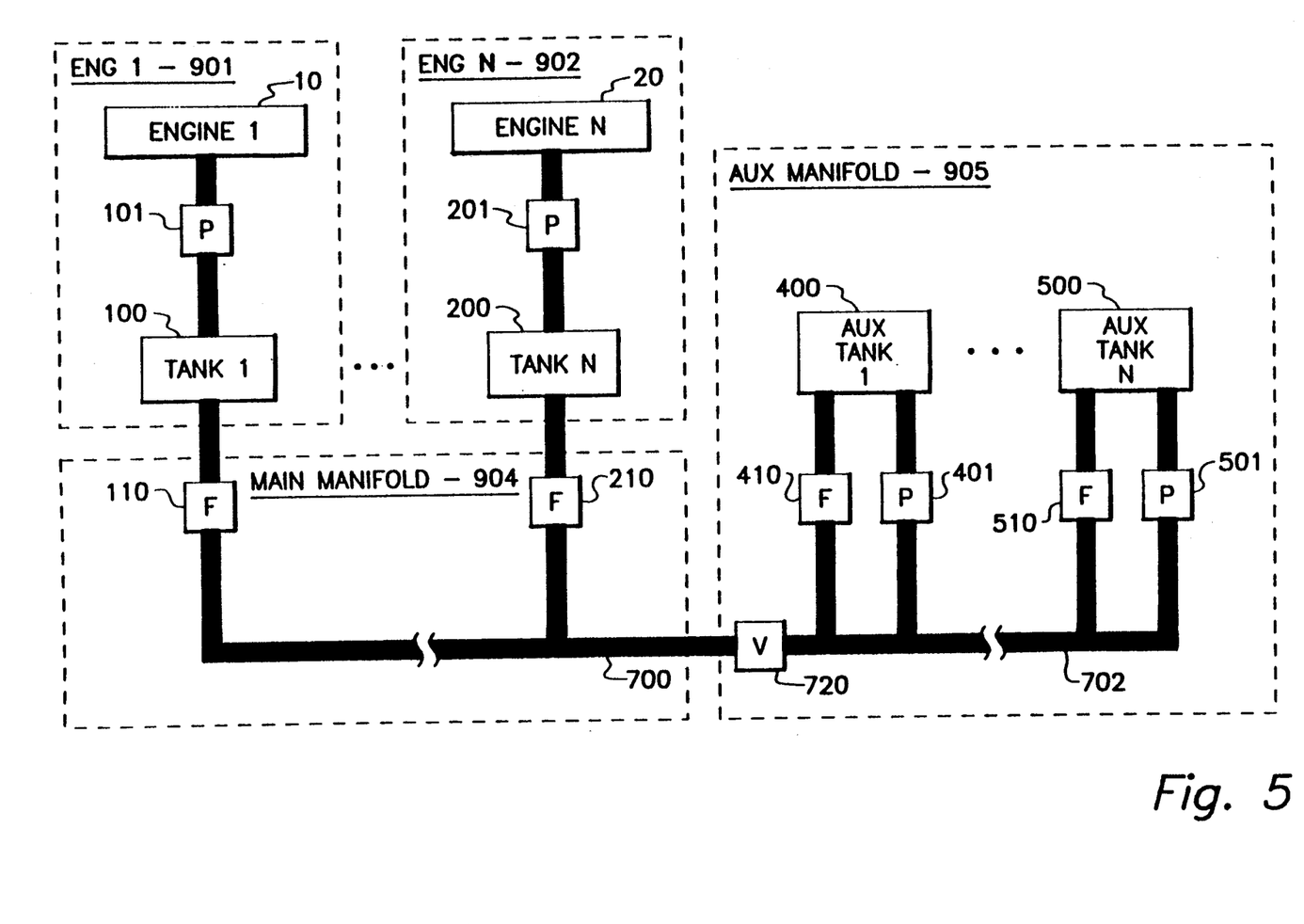
FIG. 5 shows an alternative embodiment of the system of FIG. 1.

Referring to FIG. 5, there is shown an alternative embodiment of the present invention. Subsystems ENG1 901 through ENGN 902 are defined along with a main manifold 904 and an auxiliary manifold 905. Each fuel tank (tank 1 100, tank N 200, aux tank 1 400, and aux tank n 500) has associated therewith a corresponding pump (P) 101, 201, 401, 501, and a corresponding fill valve (F) 110, 210, 410, 510, respectively. The pumps of the ENGX subsystems (where X=1 to N) are coupled between the tank 100, 200 and the corresponding ENGINEX (where X=1 to N) 10, 20. The fill valves associated with the tanks are coupled between the associated tank and manifold 700. The manifold 700 and the fill valves associated with the tanks comprise the main manifold subsystem 904. (It will be recognized by those skilled in the art that the definition of the main manifold here is by design choice, and any fill valve F 410, 510, respectively. The pumps 401, 501 and fill valves 410, 510, are each coupled to the manifold 702. Manifold 702 is coupled to manifold 700 via manifold valve (V) 720. As is readily apparent, there is

TABLE 2

The classifier input status word is represented using a sixteen bit word format and is illustrated below, followed by a description of each field in the word.

| 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|
| OFF SCH | | | TT XP | UA XP | UA FV | LA XP | LA FV | FI IN | AM IN | TAIL XFER | | MM IN | SYSTEM PHASE | | |

Status word (input) field definitions

| Bit(s) | Description |
|--------|-------------|
| 0-2 | SYSTEM PHASE - a combined represencation of the flight phase (parked, taxi, takeoff, climb, cruise, or descent) and the fuel phase (fuel distribution in the tanks, tanks that are empty). |
| 3 | MM IN - main manifold is inhibited from being used. |
| 4-5 | TAIL XFER - the tail fuel transfer needed.<br>00 - no transfer<br>01 - forward transfer<br>10 - aft transfer<br>11 - recirculation |
| 6 | AM IN - aux manifold is inhibited from being used. |
| 7 | FI IN - aux fill/isolation valve is failed. |
| 8 | LA FV - lower aux fill valve failed. |
| 9 | LA XP - both lower aux transfer pumps failed. |
| 10 | UA FV - upper aux fill valve failed. |
| 11 | UA XP - both upper aux transfer pumps failed. |
| 12 | TT XP - both tail tank transfer pumps failed. |
| 13 | not used |
| 14 | not used |
| 15 | OFF SCH - fuel quantities in the tanks do not conform to a predetermined fixed schedule. |

(Note:
0 = operational,
1 = failed)

TABLE 3

The classifier output configuration word is represented using a sixteen bit word format and is illustrated below, followed by a description of each field in the word.

| 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|
| | | | | FI VL STAT | | AX FI | TL BP | TL FI | TL FV | TL LX | TL RX | UA FV | LA FV | LA LX | LA RX |

Configuration word (output) bit field definitions:
(one bit for each component in the domain
0 = off/closed, 1 = on/open)

| Bits(s) | Description |
|---------|-------------|
| 0 | LA RX - Lower aux right transfer pump |
| 1 | LA LX - Lower aux left transfer pump |
| 2 | LA FV - Lower aux fill valve |
| 3 | UA RX - Upper aux fill valve |
| 4 | TL RX - Tail right transfer pump |
| 5 | TL LX - Tail left transfer pump |
| 6 | TL FV - Tail fill valve |
| 7 | TL FI - Tail fill/isolation valve |
| 8 | TL BP - Tail boost pump |
| 9 | AX FI - Aux fill/isolation valve |
| 10-11 | FI VL STAT - Aux fill isol valve status (the reason the aux fill isol valve is open. This is the value that provides an interface to the main manifold machine. It defines what the main manifold machine should do when the aux fill/isol valve is open.)<br>00 - valve not used<br>01 - supply aux manifold with fuel<br>10 - receive fuel from aux manifold<br>11 - undefined |
| 12-15 | not used | suitable partitioning of the control components can be defined. In general, the design choice is made such that the subsystems are independent of each other.) An aux manifold 905 includes aux tanks 1 400 through aux tank N 500, each aux tank having associated therewith a corresponding pump (P) 401, 501, and a corresponding no redundancy (or backup) control components. Thus, if pump 101 fails, engine 1 10 does not receive any fuel. Similarly, if manifold valve 720 fails, the aux tanks cannot deliver fuel to the ENGX subsystems. If no failures in the system exist, engine 1 can obtain fuel from any of the aux tanks but only via tank 1 100, and likewise for any of the other engines. Fuel can be distributed, but only in direction of aux tanks 400, 500 to tank X 100, 200, but not in the opposite direction. In delivery systems for transferring fluids (gas, petroleum, water, steam, . . . ) between storage tanks, and a user of the fluid (engines, cracking columns of refineries, . . . ) in which no catastrophic result occurs if there is a failure to deliver the fluid to the user, redundancy is not as critical as in an aircraft. A controller (not shown) is also part of the fuel delivery system of FIG. 5, as described above.

Figure 6:
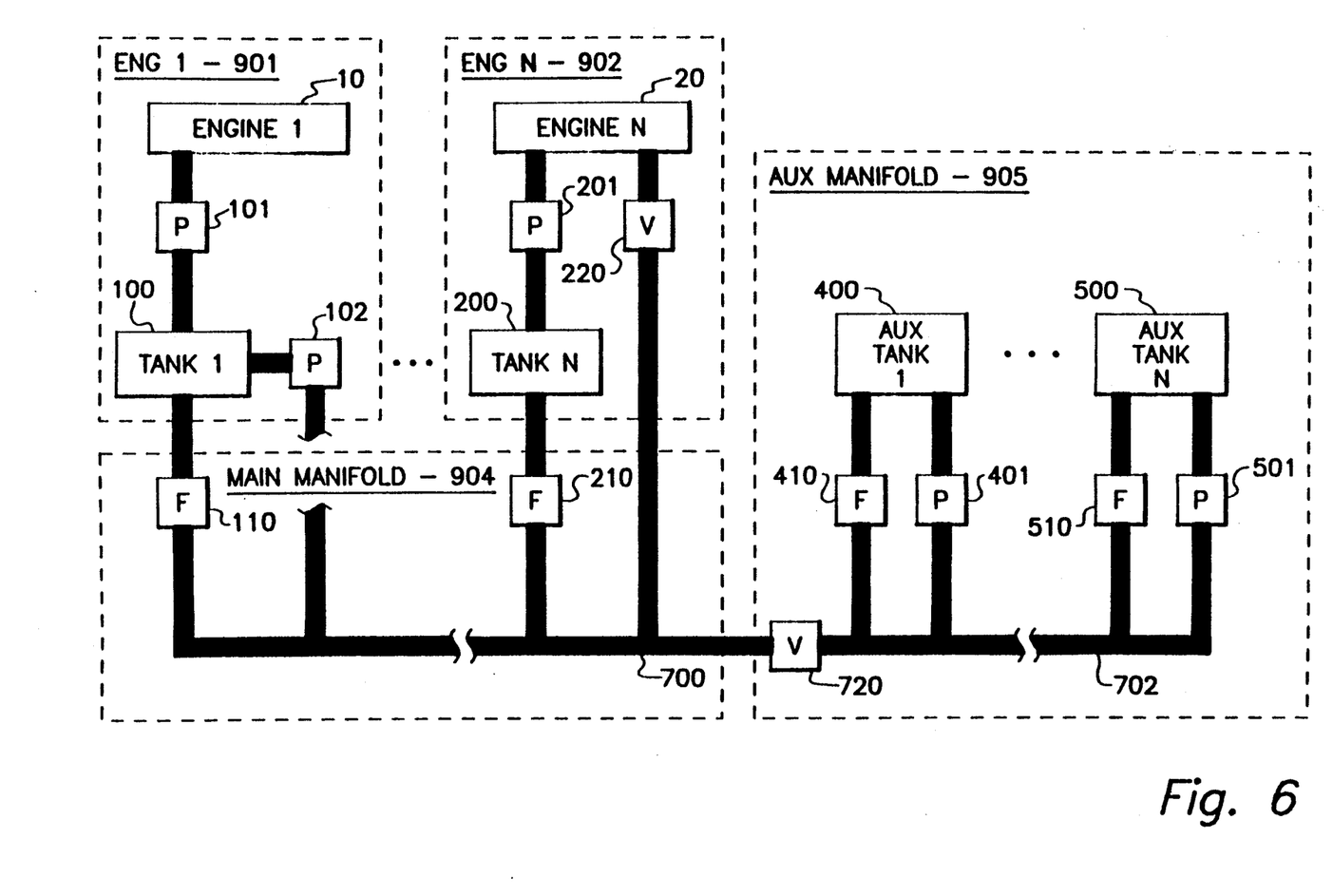
FIG. 6 shows an alternative embodiment of the system of FIG. 5.

A manifold valve 220 can be added, as shown in FIG. 6, to permit engine N 20 to have fuel delivered directly from an aux tank. Likewise, pump 102 can be added, as shown in FIG. 6, to permit the tanks 100, 200 of the ENGN (where N=1 to N) subsystems to deliver fuel from the tanks 100, 200 to the aux tanks. As more control components are added to achieve the above-stated functions, it is apparent that the architecture of the system of FIG. 6 approaches that of FIG. 1.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

I claim:

1. In an aircraft having a plurality of engines, a fuel distribution system comprising:
   a) a first plurality of fuel tanks for storing fuel, wherein each fuel tank is associated with a corresponding engine;
   b) a first plurality of pumps, each pump connected to a corresponding fuel tank for delivering fuel from the corresponding fuel tank to the corresponding engine via a corresponding engine intake manifold when said pump is operative;
   c) a main manifold;
   d) a first plurality of fill valves, each fill valve being connected between the main manifold and a corresponding fuel tank such that fuel in the main manifold flows into the corresponding fuel tank when said fill valve is operative;
   e) a controller for generating control signals to control the fuel distribution;
   f) a first plurality of manifold valves, each manifold valve being connected between the main manifold and a corresponding engine intake manifold such that fuel is permitted to flow in either direction between the main manifold and the engine intake manifold as a function of a relative pressure of the fuel in the respective manifolds created by the pumps which are operative, said pumps, said manifold valves, and said fill valves being operative in response to the control signals from the controller, thereby permitting fuel to be distributed between the plurality of tanks and further permitting at least one of said engines to be supplied fuel form a predetermined combination of said fuel tanks;
   g) an auxiliary manifold valve;
   h) an auxiliary manifold, said auxiliary manifold being connected to the main manifold via the auxiliary manifold valve;
   i) a second plurality of auxiliary fuel tanks;
   j) a second plurality of auxiliary pumps, each auxiliary pump connected between a corresponding auxiliary fuel tank and the auxiliary manifold for delivering fuel from the corresponding auxiliary fuel tank to the auxiliary manifold when said auxiliary pump is operative;
   k) a second plurality of auxiliary fill valves, each auxiliary fill valve being connected between a corresponding auxiliary fuel tank and the auxiliary manifold for receiving fuel from the auxiliary manifold to the corresponding auxiliary fuel tank when said auxiliary fill valve is operative, said auxiliary manifold valve, said auxiliary pumps, and said auxiliary fill valves being operative in response to said control signals, thereby permitting fuel to be distributed between auxiliary fuel tanks, simultaneously with fuel distribution between fuel tanks, and permitting fuel to be distributed between a predetermined plurality of auxiliary fuel tanks and fuel tanks simultaneously; and
   l) a first plurality of output pumps, each output pump connected between a corresponding fuel tank and the main manifold for delivering fuel from the corresponding fuel tank to the main manifold in response to the control signals.

* * * * *